Patented Feb. 8, 1927.

1,616,904

UNITED STATES PATENT OFFICE.

LESTER KIRSCHBRAUN, OF CHICAGO, ILLINOIS.

EMULSION AND METHOD OF PRODUCING SAME.

No Drawing.   Application filed December 7, 1925.  Serial No. 73,887.

This invention relates to emulsions and method of producing same, and refers more particularly to an emulsion in which a bituminous or pitchy waterproofing material is dispersed in discrete particles in an aqueous vehicle by means of a dispersing agent, such as a paste-forming mineral powder, or the like. Among the finely divided powders, which may be used within the contemplation of the present invention, may be cited clay, bentonite, fuller's earth, mineral pigments, slate dust, ochre, sienna, metallic oxides and hydroxides, and silicates, which produce a viscous plastic mixture with water.

Heretofore, United States patents have issued to me covering methods of producing such an emulsion, such as Patent No. 1,302,810, dated May 6, 1919, and No. 1,506,371, dated August 26, 1924, and I also have pending United States application Serial No. 343,392, filed under date of December 9, 1919, in the name of Lester Kirschbraun and F. C. Overbury.

The present invention is particularly directed to the treatment of emulsions made in accordance with said patents and pending application.

In the commercial manufacture of emulsions, especially by the continuous process, the emulsion product as it issues from the emulsifier is generally of a heavy pasty consistency. Such an emulsion made, for example, with a mixture of substantially half clay and half bentonite as an emulsifying agent, carries about 35% of water.

It has been the practice in the past to thin this heavy material with water in order to reduce it to a sufficiently fluid condition to allow its application in the various arts, for instance, to be used as a waterproof covering or paint, and also to be introduced as a waterproofing material into wet fibrous stock in the beater, or applied as a waterproofing film between wet fibrous plies of fibrous stock.

The addition of water, in many instances, is undesirable, owing to the fact that the material must be shipped considerable distances and the content of the bituminous or pitchy waterproofing material is reduced by the extent that the emulsion requires dilution. A further objection to the addition of large amounts of water, in certain instances, is that it renders the emulsion sensitive to freezing conditions of temperature.

As a particular feature of the present invention, I have found that if the stiff, pasty product referred to above is subjected, subsequent to emulsification, while in its pasty state and without the addition of any water, or, at least, without the addition of a substantial amount of water, to a rapid beating or agitating action, it becomes fluid without the addition of water, assuming a heavily bodied molasses-like consistency, which is exceedingly desirable.

Just what the explanation of this phenomena is, I am unable to state, other than that it would seem likely that the emulsion, as first made, possesses a gel structure, and that the whipping or beating in some way alters this gel structure, reducing the internal viscosity of the mass and permitting it to flow.

The material produced in this way possesses a body quite different from the same product brought to a similar degree of fluidity by water. The product produced by thinning with water is "short", whereas the fluid product produced by beating is "long", pouring like molasses or heavy tar. This so-called "body" is most advantageous in connection with the application of the emulsion as a paint.

When bodied in this way, the material so treated spreads and flows under the brush like oil paint rather than as an aqueous dispersion.

I do not, of course, wish to limit myself to any particular method of beating, whipping, or subjecting the heavy pasty emulsified mass to agitation, as any method may be used which is found desirable. Further, I do not wish to limit myself to the treatment of emulsions using paste-forming mineral emulsifying agents, as the invention is applicable to the treatment of any emulsions which, as produced, are in the form of a thick, heavy paste which may be thinned without the addition of any substantial amount of water by subjecting them to a beating or whipping action.

I claim as my invention:

1. A process of rendering a relatively stiff emulsion of the bitumen-pitch type of paste-like consistency more fluid independently of the addition of a substantial amount of diluent, comprising subjecting said emulsion to a beating action.

2. A process of rendering a relatively stiff emulsion of the bitumen-pitch type of paste-like consistency more fluid independently of the addition of a substantial amount of diluent, comprising subjecting said emulsion to a whipping action.

3. A process of rendering a relatively stiff emulsion of the bitumen-pitch type of paste-like consistency more fluid independently of the addition of a substantial amount of diluent, comprising subjecting said emulsion to an agitating action.

4. A process of rendering an emulsion of the bitumen-pitch type of paste-like consistency more fluid without the addition of the amount of water that would be required to reduce said emulsion to said fluidity, comprising subjecting said paste-like emulsion to an agitating action.

5. A process for substantially decreasing the amount of diluent required for reducing an aqueous bitumen-pitch type emulsion of paste-like consistency to a fluid consistency consisting in subjecting said emulsion of paste-like consistency to an agitating action to render same more fluid.

6. A process for substantially decreasing the amount of diluent required for reducing an aqueous bitumen-pitch type emulsion of paste-like consistency to a fluid consistency consisting in subjecting said emulsion of paste-like consistency to an agitating action, and continuing said agitating action until the desired degree of fluidity is obtained.

7. A process of rendering an emulsion of paste-like consistency of the bitumen and mineral powder type more fluid, comprising subjecting said paste-like emulsion to an agitating action without the addition of a substantial amount of a diluent to render same more fluid.

8. A process for substantially decreasing the amount of diluent required for reducing an aqueous emulsion of paste-like consistency to a fluid consistency consisting in subjecting said emulsion of paste-like consistency to an agitating action, and continuing the said agitating action until the desired degree of fluidity is obtained.

LESTER KIRSCHBRAUN.